United States Patent
Price et al.

(10) Patent No.: US 7,180,615 B2
(45) Date of Patent: Feb. 20, 2007

(54) ONE CLICK PRINTING IN A WEB BROWSER

(75) Inventors: Stephen Goddard Price, Longmont, CO (US); David Earl Stone, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 09/753,598

(22) Filed: Jan. 3, 2001

(65) Prior Publication Data

US 2002/0085224 A1 Jul. 4, 2002

(51) Int. Cl.
G06F 3/12 (2006.01)
G06K 1/00 (2006.01)

(52) U.S. Cl. ...................... 358/1.15; 358/1.1

(58) Field of Classification Search .............. 358/1.15, 358/468, 403, 1.18, 1.1, 1.14, 1.13
See application file for complete search history.

(56) References Cited

U.S. PATENT DOCUMENTS

| | | | |
|---|---|---|---|
| 5,737,619 A | | 4/1998 | Judson |
| 6,041,309 A | | 3/2000 | Laor |
| 6,067,560 A | | 5/2000 | Potts, Jr. |
| 6,327,045 B1 | * | 12/2001 | Teng et al. ............... 358/1.15 |
| 6,445,468 B1 | * | 9/2002 | Tsai ............................ 358/402 |
| 6,473,203 B1 | * | 10/2002 | Hisatomi et al. ........... 358/403 |
| 6,609,843 B2 | * | 8/2003 | Mahoney et al. ............ 400/70 |
| 6,631,010 B1 | * | 10/2003 | Foster et al. .............. 358/1.15 |
| 6,750,978 B1 | * | 6/2004 | Marggraff et al. ......... 358/1.12 |
| 2002/0072998 A1 | * | 6/2002 | Haines et al. ................ 705/28 |
| 2002/0093676 A1 | * | 7/2002 | Parry ......................... 358/1.15 |
| 2004/0075682 A1 | * | 4/2004 | Burleson .................... 345/738 |
| 2005/0021608 A1 | * | 1/2005 | Wolff ......................... 709/203 |

FOREIGN PATENT DOCUMENTS

| | | |
|---|---|---|
| EP | 0 872 792 A2 | 10/1998 |
| EP | 9 920 180 A2 | 6/1999 |
| EP | 0 957 438 A2 | 11/1999 |
| JP | 2001-14120 * | 1/2001 |
| WO | WO 98/48359 | 10/1998 |
| WO | WO 99/27468 | 6/1999 |

OTHER PUBLICATIONS

"Controlling Amount of Printouts of Hyper Document," IBM Technical Disclosure Bulletin, vol. 39, No. 11, Nov. 1996, pp. 133-135.
"Method of Distributed Printing Solution for Web-Based Document Management System With Separated Secure Printing Support Client," RD 428147, Disclosed by International Business Machines Corporation, 1 page.

* cited by examiner

*Primary Examiner*—Dov Popovici
(74) *Attorney, Agent, or Firm*—David W. Lynch; Chambliss, Bahner & Stophel P.C.

(57) ABSTRACT

A method and apparatus for implementing one click printing in an application such as a web browser. The present invention exploits the "pull print" method without requiring copying of the URL. An application is enhanced so that when the user clicks on the link for the pre-formatted document, the application contacts the user's printer, print server, or other device that accepts print jobs, and submits a "pull print" request referring to the URL. Alternatively, the user accesses the context menu for a link which points to a printable document, the menu presented includes a choice to directly print the document, and then the "pull print" is done.

26 Claims, 8 Drawing Sheets

ONE CLICK PRINTING IN A WEB BROWSER

BACKGROUND OF THE INVENTION

1. Field of the Invention

This invention relates in general to communications in a printing system, and more particularly to a method and apparatus for implementing one click printing in a web browser.

2. Description of Related Art

The Internet is a fusion of many different networks, public and private, big and small, that have agreed to connect to one another. An intranet is a network which is restricted and while it may follow the Internet protocol, none or only part of the network available from outside a "firewall" surrounding the intranet is part of the agreed connection to the Internet. The composite network represented by these networks relies on no single transmission medium. Rather, bi-directional communication can occur via satellite links, fiber-optic trunk lines, phone lines, cable TV wires and local radio links. When a client computer logs onto the Internet at a university, a corporate office or from home, everything looks local, but the access to the network does cost time and line charges.

A particularly important part of the Internet is the World Wide Web. The World Wide Web is comprised of a number of computers scattered throughout the Internet that provide information in the form of graphical documents called Web pages. The growth of the Internet, and particularly the World Wide Web, have accelerated the development of new standards and programming languages for creating content for the World Wide Web such as the Hyper Text Markup Language (HTML), the Virtual Reality Modeling Language (VRML), the Java™" programming language, and scripting languages developed for use in HTML documents.

From a user's point of view, access to the Internet and its services typically are accomplished by invoking a network application program such as a network browser. The network application program acts as an interface between the user and the Internet. Network application programs are typically "client" applications that accept commands from the user and obtain Internet data and services by sending requests to "server" applications on other computers at other locations on the Internet.

While there are a number of different types of network application programs, perhaps the most important application for retrieving and viewing information from the Internet is the network browser. The network browser is commonly referred to today as a web browser because of its ability to retrieve and display Web pages from the World Wide Web. Some examples of commercially available browsers include the Internet Netscape® Navigator by Netscape Communications of Mountain View, Calif., and Mosaic developed at NCSA, University of Illinois.

To retrieve information from computers on the Internet, web browsers send network requests via the File Transfer Protocol (FTP), Simple Mail Transfer Protocol (SMTP), Hyper Text Transfer Protocol (HTTP), Gopher document protocol and others. A web browser and server applications use these network requests to exchange data across the Internet, or some other computer network. HTTP is a protocol used to access data on the World Wide Web. In particular, web browsers use HTTP to retrieve documents created in the HTML from Web servers on the Internet, in intranets, or from the user's own local file system on the hard drive. The location of resource such as an HTML document is defined by an address called a URL ("Uniform Resource Locater"). Web browsers use the URL to find and fetch resources from the Internet and the World Wide Web.

For example, if one is currently at a Web-site (i.e., in a particular Hypertext Markup Language (HTML) document), at which there is a highlighted or embedded "hypertext link" specifying the Internet address of another Web-site (i.e., another HTML document), then the user can access (i.e., "surf to") this other Web-site by simply "clicking on" or selecting the highlighted URL with his or her pointing device (e.g., "mouse") in a conventional manner. The ability to connect to other Web-sites by simply pointing and clicking on highlighted URLs embedded in an HTML document has contributed enormously to the growth and popularity of the Internet in the last few years.

If the user desires to connect to a Web-site that is not referenced in a HTML document viewed through a browser program, then the user oftentimes finds it necessary to manually enter the URL of the Web-site (e.g., "http://www.metrologic.com") into the browser program. This requires manually pressing a sequence of keys on a keyboard or remote control device, corresponding to the characters of the URL being selected. In addition to being time consuming, this Web-site surfing technique is prone to errors, causing the browser program to connect to the wrong Web-site or return an error message. From a practical point of view, this is quite frustrating to the Internet user.

A hypertext link may also be associated with portions of images or control features such as buttons, menus, and the like. Hypertext links allow a user to navigate from the source document to the target document by activation of the link and thereby retrieve the target document in this fashion. For example, web browser users sometimes encounter links to pre-formatted documents they wish to print (such as PDF, PostScript, and PCL files). The conventional way to print them is either to:

A) download and send them to a printer (postscript and PCL files)

B) download them, open them in a viewer, and select "print", which formats the document through a print driver(PDF files)

C) copy the URL, use the browser to go to a printer web page which provides an interface to "pull" printing, and enter the URL, telling the printer to access the document directly from the server and print it However, each of the above printing methods have disadvantages. For example, the first two method require the user to download the document thereby preventing the user from continuing to surf the web. This ties up the user's system while the document is being downloaded. The third method is rather new and requires the printer to have a built-in web server, and many web pages. One of those pages is for requesting "pull" printing. The user fills in a box with the URL of a file and clicks "submit." Then the printer fetches the document from the server and prints it. An advantage to this third method is that the document does not pass through the user's system during the process. Nevertheless, an easier method of printing documents that exploits the modern "pull print" method without requiring copying of the URL is not provided.

It can be seen that there is a need for a method and apparatus for implementing one click printing in a web browser.

SUMMARY OF THE INVENTION

To overcome the limitations in the prior art described above, and to overcome other limitations that will become apparent upon reading and understanding the present specification, the present invention discloses a method and apparatus for implementing one click printing in a web browser.

The present invention solves the above-described problems exploiting the modern "pull print" method without requiring copying of the URL. A web browser is enhanced so that when the user clicks on the link for the pre-formatted document, the web browser contacts the user's printer, print server or other device which accepts print jobs, and submits a "pull print" request referring to the URL. Alternatively, the user accesses the context menu for a link which points to a printable document, the menu presented includes a choice to directly print the document, and then the "pull print" is done.

A method in accordance with the principles of the present invention includes providing a document identifier for a document to a print job acceptor using a single user action and acquiring and printing the document by the print job acceptor based upon the provided document identifier.

Other embodiments of a method in accordance with the principles of the invention may include alternative or optional additional aspects. One such aspect of the present invention is that the document identifier comprises a uniform resource locator.

Another aspect of the present invention is that the single user action comprises clicking on the uniform resource locator.

Another aspect of the present invention is that the providing comprises sending the uniform resource locator to the print job acceptor.

Another aspect of the present invention is that the single user action comprises displaying a context menu associated with the uniform resource locator and selecting to direct print the document identified by the uniform resource locator using a single operation of a cursor control device.

Another aspect of the present invention is that the providing comprises sending the uniform resource locator to the print job acceptor based upon the selection of the direct print of the document.

Another aspect of the present invention is that cursor control device comprises a computer mouse and the single operation comprises depressing a mouse button to cause the context menu to be displayed and releasing the mouse button with the cursor positioned over a direct print menu selection to cause the direct print of the document identified by the uniform resource locator to be selected.

Another aspect of the present invention is that the method further includes configuring an application for one click printing prior to providing a document identifier.

Another aspect of the present invention is that the configuring an application for one click printing comprises installing an application plug-in for interpreting the user actions.

Another aspect of the present invention is that the installing further comprises selecting a print job acceptor for providing one click printing.

Another aspect of the present invention is that the installing further comprises displaying a menu for selecting a print job acceptor for providing one click printing.

Another aspect of the present invention is that the installing further comprises sending a query to all print job acceptors to determine whether a print job acceptor supports direct printing.

Another aspect of the present invention is that the providing a document identifier for a document to a print job acceptor using a single user action further comprises selecting a document, determining whether the selected document can be handled by the print job acceptor and submitting the document identifier to the print job acceptor for acquiring and printing the document when the document can be handled by the print job acceptor.

Another aspect of the present invention is that the method further includes determining whether a plug-in for handling the data is installed and submitting the document identifier to the print job acceptor for acquiring and printing the document when the plug-in for handling the document is installed.

Another aspect of the present invention is that the method further includes displaying a menu for selecting viewing or printing the document when the plug-in for handling the document is installed.

In another embodiment of the present invention, a plug-in for providing one click printing is provided. The plug-in includes an analyzer for analyzing a position of a cursor to obtain a document identifier associated with a document to be printed, an interpreter for interpreting a user's actions to determine when the user has selected to print a document associated with the document identifier using a single user action and a pull print requester for sending the obtained document identifier to a print job acceptor when the interpreter has determined that the user has selected to print a document associated with the document identifier using a single user action.

In another embodiment of the present invention, an article of manufacture is provided. The article of manufacture includes a program storage medium readable by a computer embodying one or more programs of instructions executable by the computer to perform a method for providing one click printing, wherein the method includes providing a document identifier for a document to a print job acceptor using a single user action and acquiring and printing the document by the print job acceptor based upon the provided document identifier.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for implementing one click printing in an application such as a web browser. The present invention exploits the "pull print" method without requiring copying of the URL. An application is enhanced so that when the user clicks on the link for the pre-formatted document, the application contacts the user's printer, print server or other device that accepts print jobs, and submits a "pull print" request referring to the URL. Alternatively, the user accesses the context menu for a link which points to a printable document, the menu presented includes a choice to directly print the document, and then the "pull print" is done.

Figure 1:
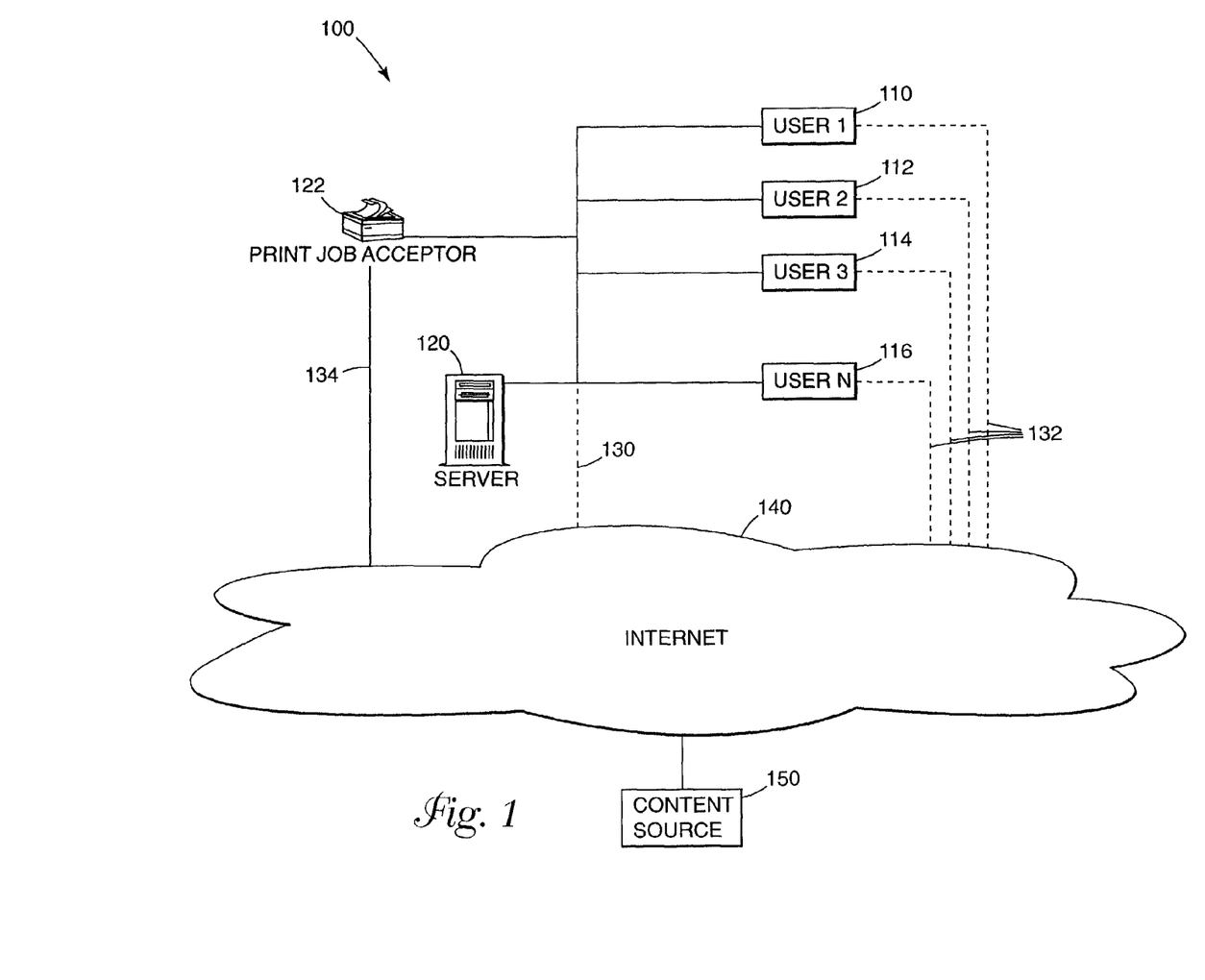
FIG. 1 illustrates a block diagram of a networked system according to the present invention.

FIG. 1 illustrates a block diagram 100 of a networked system according to the present invention. In FIG. 1, N workstations 110–116 are coupled to a network server 120. A network printer, print server or other device that accepts print jobs 122 is coupled to the N workstations 110–116 and server 120. Those skilled in the art will recognize that the present invention is not meant to be limited to printers, but that devices other than printers may attach to networks and accept print jobs as if they are printers (e.g., print servers). Thus, the term "print job acceptor" will be used herein to refer to any device according to the present invention that accepts print jobs, including, but not limited to, printers and print servers.

The N workstations may include a direct connection 130 to the Internet 140 for accessing at least one content source 150. Alternatively, the N workstations 110–116 may individually connect 132 to the Internet 140. In addition, the network print job acceptor 122 includes a connection 134 to the Internet 140.

One of the N workstations 110–116 may access the content source 150 via connection 130 or 132. If a user 110–116 wants to print a document from the content source 150, the user 110–116 can print the document by selecting a print command from the file menu or by clicking on a print selection, which is generally displayed at the top of the application. The document is then downloaded, and can subsequently be printed. However, this ties-up the user 110–116 because the at least the user's browser is locked while the document is being downloaded.

A third alternative is for the user 110–116 to copy a URL in the address block to command the application to go to a web page of the print job acceptor 122 which provides and interface to "pull" printing, and enter the URL of the document to be printed therein to tell the print job acceptor 122 to access the document directly via connection 134 and print it. This requires that the print job acceptor 122 have access to the Internet via connection 134. Nevertheless, this method requires the print job acceptor 122 to have a built-in web server and at least one web page, which is for requesting "pull" printing. The print job acceptor 122 fetches the document and prints it.

An advantage to this third method is that the document does not pass through the user's system 110–116 during the process. Nevertheless, the user 110–116 must perform the steps correctly to ensure that the print job acceptor 122 accesses the correct page. Most users 110–116 don't know how to transfer the URL to the pull print web page of the print job acceptor 122 automatically. If the URL is spelled out in the web page the user 110–116 is viewing, the user 110–116 must memorize the URL or write it down, and manually enter it in the pull print web page of the print job acceptor 122. Sometimes the URL is not spelled out, and the user 110–116 does not know how to find out the actual URL. Further, the user 110–116 is prevented from viewing other web pages within this browser window during the process or instructing the print job acceptor 122 to download the document to be printed.

According to the present invention, an application is enhanced so that when the user 110–116 clicks on the link for the pre-formatted document, the application contacts the user's print job acceptor 122, and submits a "pull print" request referring to the URL. Alternatively, a user 110–116 accesses the context menu for a link which points to a printable document, the menu presented includes a choice to directly print the document, and then the "pull print" is submitted to the print job acceptor 122. The print job acceptor 122 then uses the URL to print the selected document by directly accessing the document via connection 134.

Figure 2A:
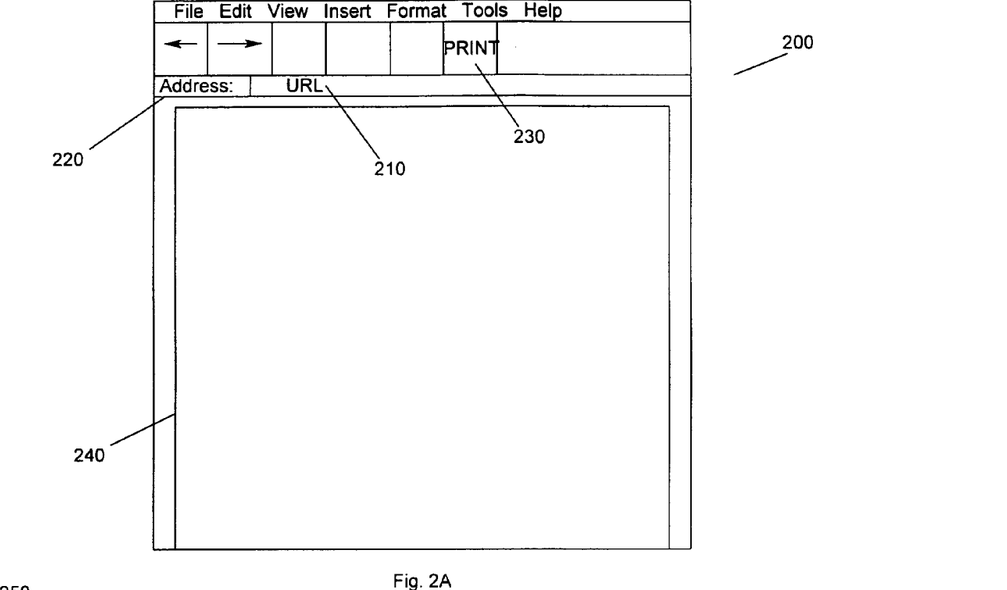
FIG. 2A illustrates a browser according to the present invention.

FIG. 2A illustrates a browser 200 according to the present invention. The browser includes a URL block 210 for entering an address 220. A "PRINT" icon 230 may be included in the browser 200. The browser 200 also includes a display 240 for viewing a document associated with the URL 210.

Figure 2B:
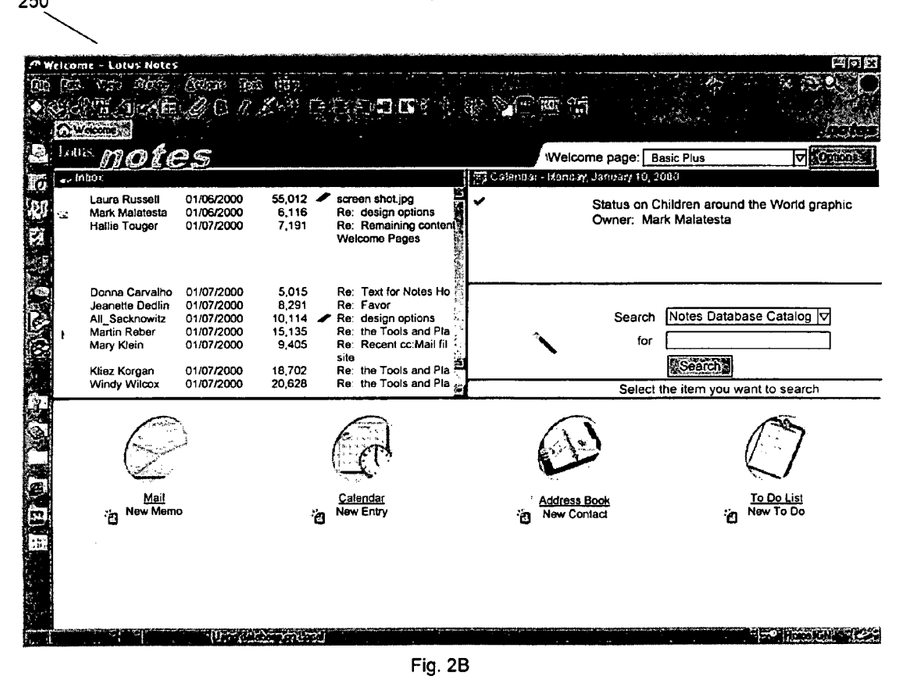
FIG. 2B illustrates another application which may be configured to provide one click printing according to the present invention.

Besides web browsers, this idea can be extended to other applications that reference URLs (for example, Lotus Notes). FIG. 2B illustrates another application 250 which may be configured to provide one click printing according to the present invention.

The one click print function may be implemented in any browsers or application such as Netscape® Navigator, which support "plug-ins." A plug-in is a piece of code which handles specific file types. The present invention could be implemented as a plug-in. There are no common plug-ins for PostScript and PCL files. For those files, the plug-in would submit the pull print request when the URL is selected with the normal single click. This would be true one-click printing in any environment. There already is a widely-used plug in for PDF files: Adobe Acrobat. If Acrobat is not installed, PDF files would be printed just like PostScript and PCL files.

Figure 3A:
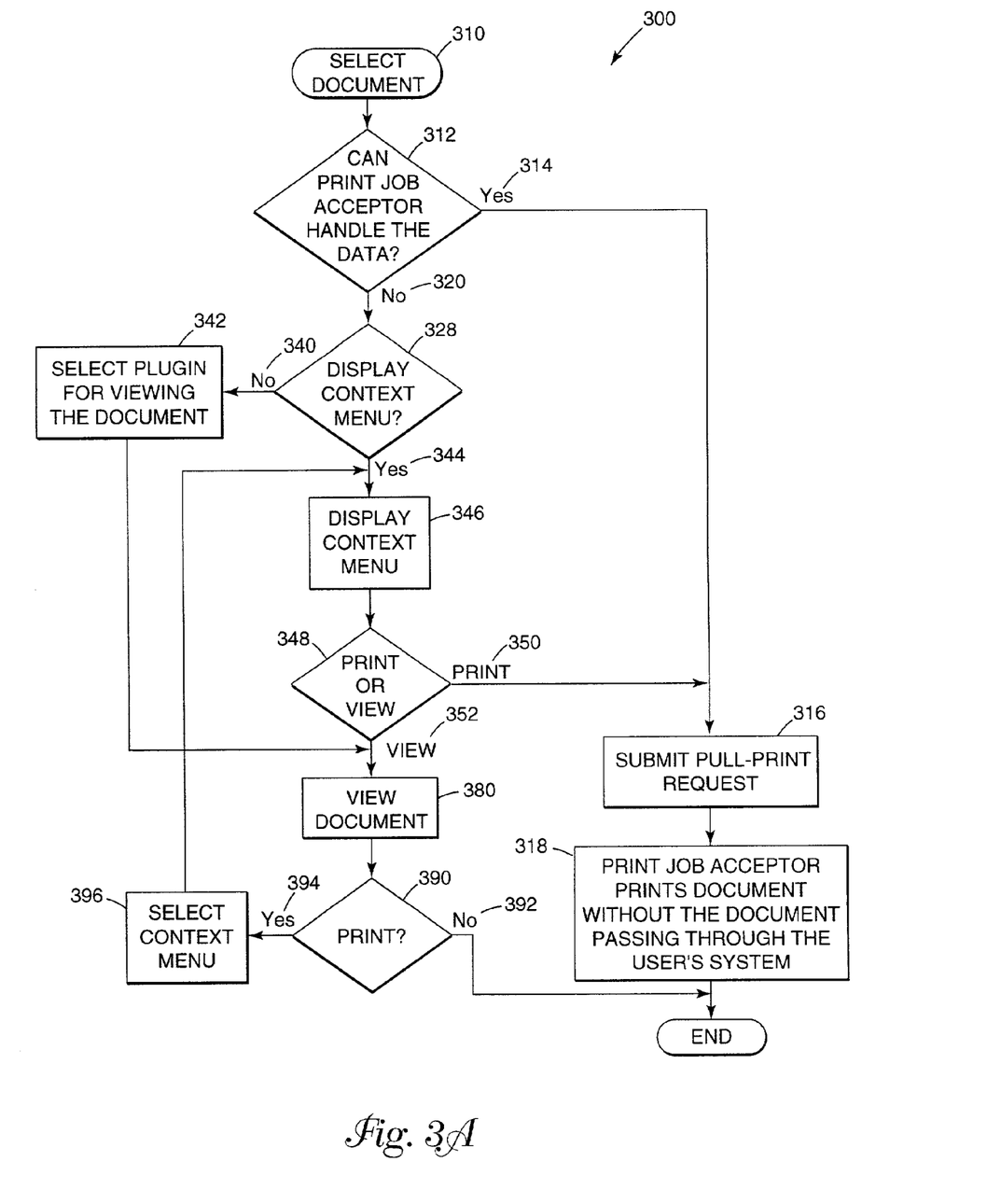
FIG. 3A illustrates a flow chart for one click printing according to the present invention.
Figure 3B:
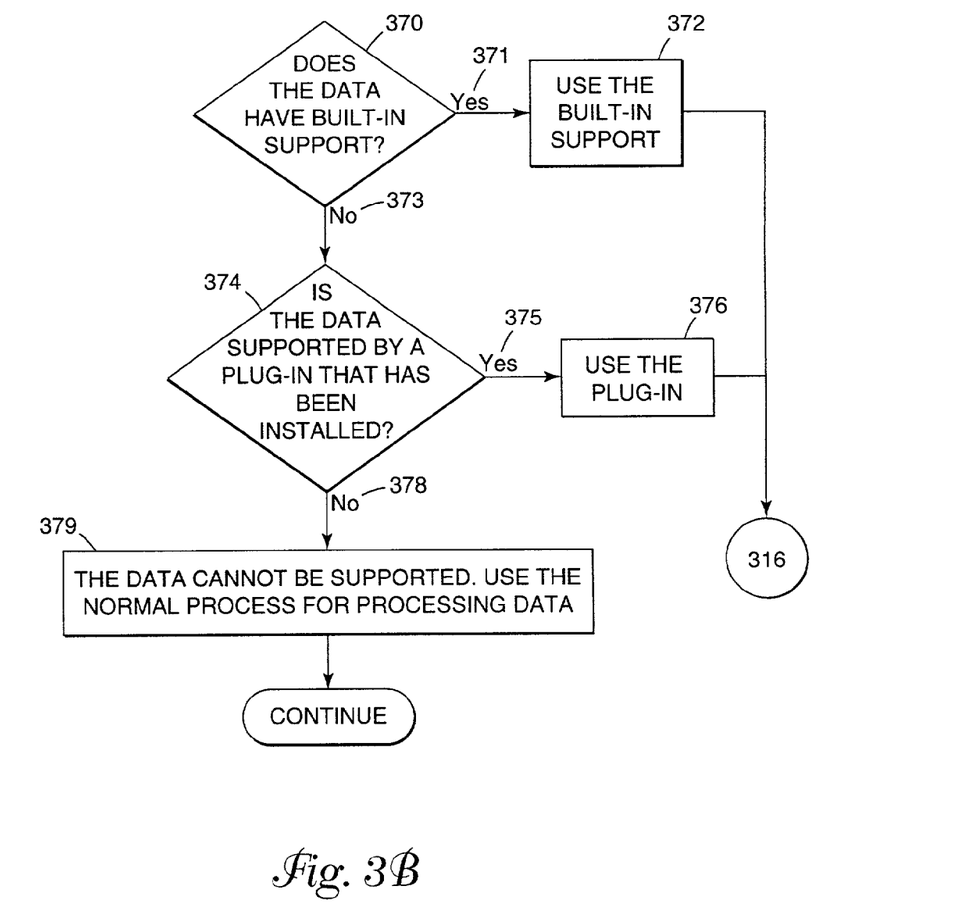
FIG. 3B is a flow chart showing one method for deciding how to handle data.

FIG. 3A illustrates a flow chart 300 for one click printing according to the present invention. In FIG. 3A, a decision is made as to whether the print job acceptor can handle the data 312. FIG. 3B is a flow chart showing one method for deciding how to handle data. In FIG. 3B, a decision is made as to whether the data have built-in support 370. If yes 371, the built-in support is used 372 and the process continues to 316. If no 373, a decision is made as to whether the data is supported by a plug-in that has been installed 374. If yes 375, the plug-in is used 376 and the process continues to 316. If no 378, the data cannot be supported and the normal process for processing data is used 379.

Figure 3C:
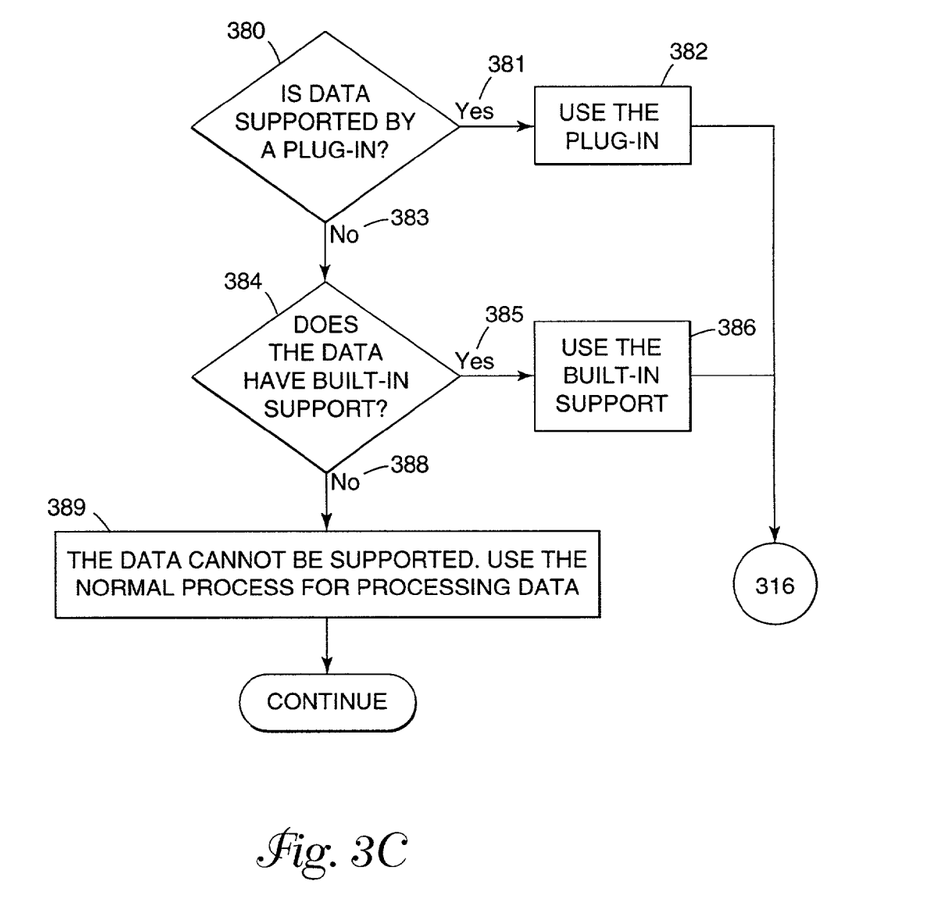
FIG. 3C is a flow chart showing a second method for deciding how to handle data.

FIG. 3C is a flow chart showing a second method for deciding how to handle data. In FIG. 3C, a decision is made as to whether there is a plug-in supporting the data 380. If yes 381, the plug-in is used 382 and the process continues to 316. If no 383, a decision is made as to whether the data has built-in support 384. If yes 385, the built-in support used 386 and the process continues to 316. If no 388, the data cannot be supported and the normal process for processing data is used 389.

Returning to FIG. 3A, if the print job acceptor can handle the data 314, a pull-print request is submitted to the one click print job acceptor 316. Then the document is printed without the document passing through the user's system 318. If the print job acceptor can not handle the data 320, a decision is made as to whether to display a context menu for printing the document 328. If the context menu is to be displayed 344, a display presents the user options for viewing or one click printing 346.

If Acrobat is installed as a plug-in, then the one click printing plug-in would either pop up a menu giving a choice between "print" and "view" when the URL is selected, or let Acrobat always be selected when a normal link selection is made. Also, the plug-in would add a choice to the context menu for PDF URLs for "direct print." For example, in Windows®, the "context menu" is normally activated by pressing the right mouse button on the item. Then a menu appears, and the cursor is moved to the chosen menu item and released; thus providing "one-click printing." Other systems, such as Apple Macintosh®, which has a one-button mouse, will be different.

Then a decision is made as to whether to print or view the document 348. If a decision is to print the document 350, then a pull-print request is submitted to the one click print job acceptor 316. Then the document is printed without the document passing through the user's system 318. If the view option is selected 352, the document is presented for display 354. If a context menu is not to be displayed, the plug-in associated with the document is selected 342 and the document is presented for display 354. Thereafter, a decision may be made whether to print the document or not 356. If not 358, no further action is required. If a decision is made to print the document 360, the context menu may be selected 362 to present a one click printing option to the user 346.

Figure 4:
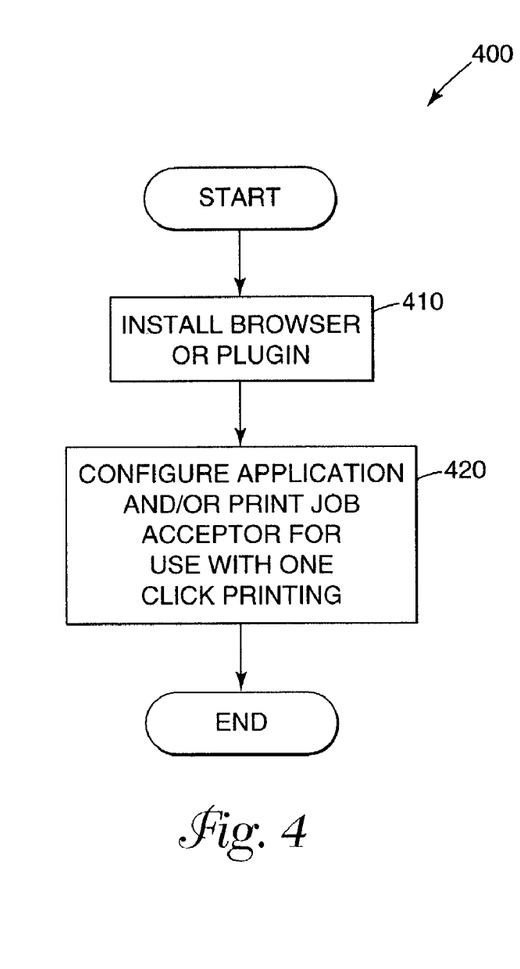
FIG. 4 illustrates a flow chart for one click print job acceptor selection according to the present invention.

FIG. 4 illustrates a flow chart 400 for one click print job acceptor selection according to the present invention. When installing the application or plug-in 410, the user may be given a menu for selecting which print job acceptor to use when requesting one-click printing 420. The user's system default print job acceptor could be the automatic choice to use.

Figure 5:
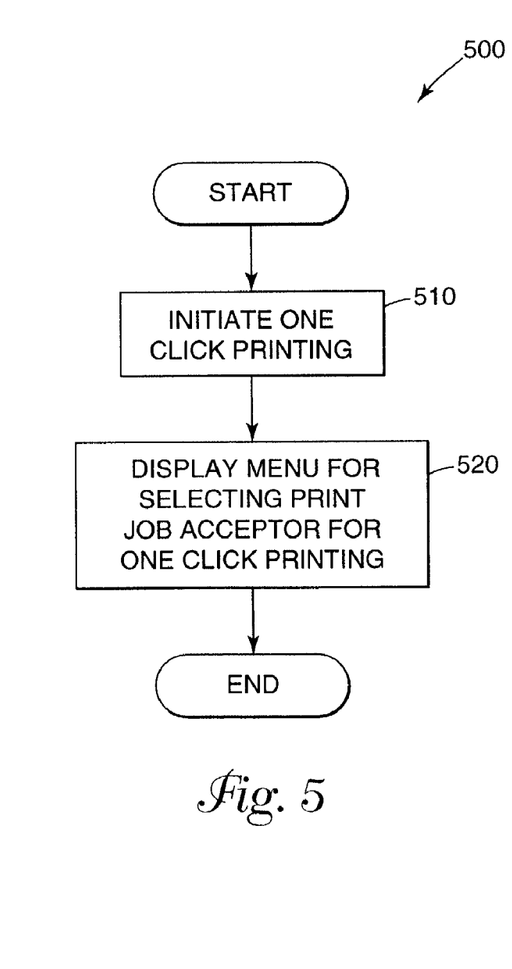
FIG. 5 illustrates a flow chart of another method for selecting the print job acceptor for performing one click printing according to the present invention.

FIG. 5 illustrates a flow chart 500 of another method for selecting the print job acceptor for performing one click printing according to the present invention. In FIG. 5, one click printing is initiated by the user 510. Then, a menu may be displayed for selecting which print job acceptor to select for one click printing. Thus, the user is presented with a menu for choosing which print job acceptor to use each time they make a one-click print request.

Figure 6:
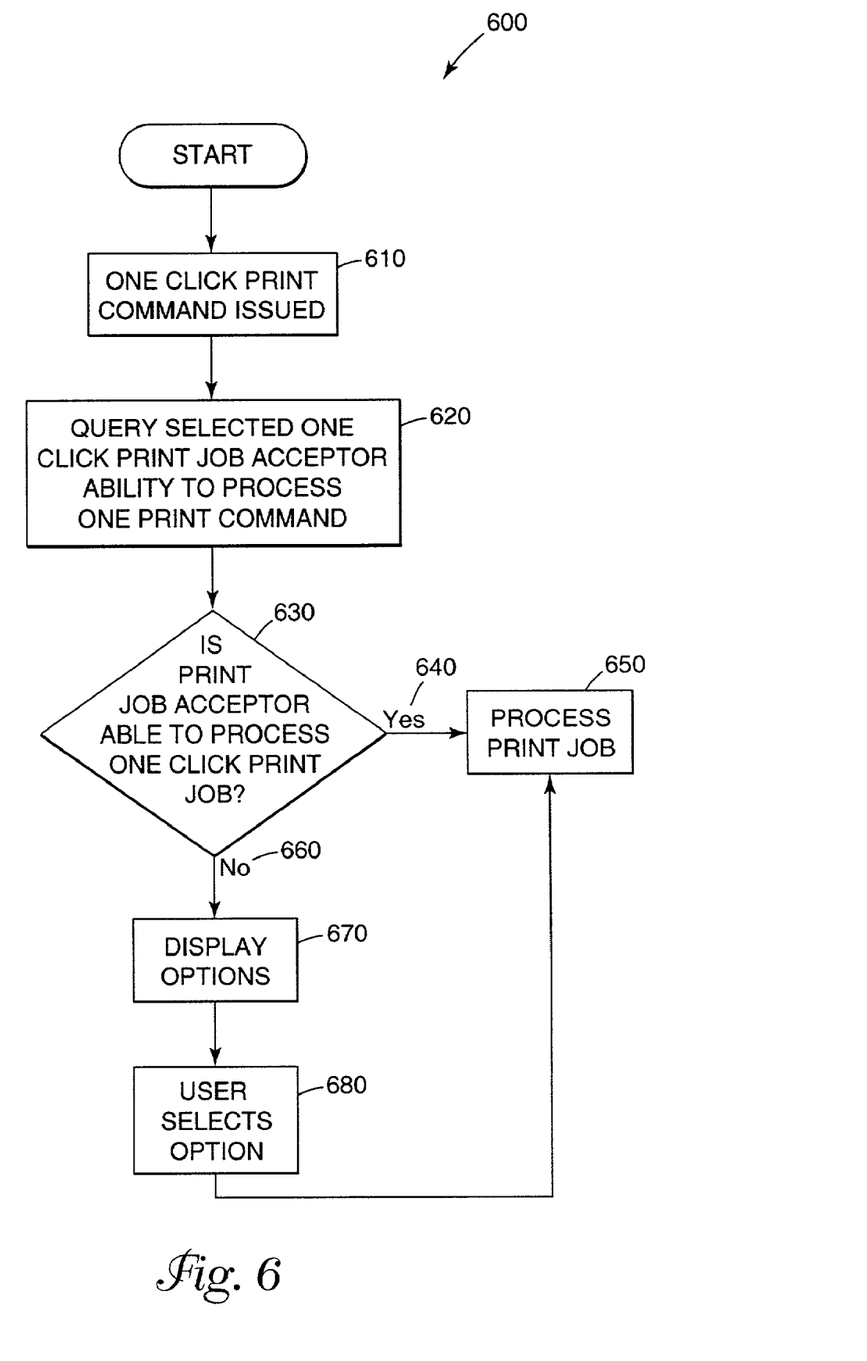
FIG. 6 illustrates a flow chart of a query involved in one click printing according to the present invention.

FIG. 6 illustrates a flow chart 600 of a query involved in one click printing according to the present invention. In FIG. 6, a user causes a one click command to be issued 610. A query is then made to the selected one click print job acceptor to ensure that the print is online and is capable of handling pull print requests for the type of file being processed 620. The query may be performed using Simple Network Management Protocol, which allows a network device to send messages, called protocol data units (PDUs), to different parts of a network. Then, SNMP-compliant compliant devices, called agents, which store data about themselves in Management Information Bases (MIBs), return this data to the SNMP requesters. The decision is made whether the print job acceptor is capable of handling the pull print request 630. If yes 640, the pull-print request is submitted to the one click print job acceptor and the document is printed without the document passing through the user's system 650. If not 660, options are presented to the user 670. The user selects the appropriate options 680 and the document is then printed 650.

For example, the present invention could query the network to find all print job acceptors, and then find out which ones support pull printing to make sure the pull print request can be handled on the selected print job acceptor. This query could be done at the time the plug-in is installed, each time the browser is started, or each time the plug-in is activated.

According to a preferred embodiment for print job acceptor selection according to the present invention, the user's system default print job acceptor would be queried and used if it supports pull printing. Otherwise, the user is asked to select a default pull-print, print job acceptor. The default pull print job acceptor is then used for all future requests. Nevertheless, as illustrated in FIG. 6, the user is provided a way to change that selection, or delete the selection.

Figure 7:
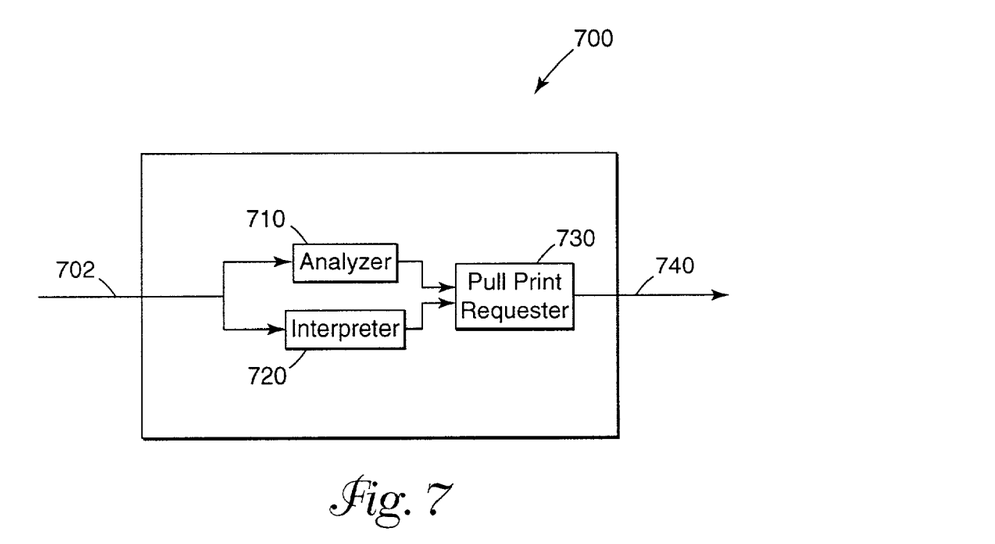
FIG. 7 illustrates a plug-in to an application for providing one click printing according to the present invention.

FIG. 7 illustrates a plug-in 700 to an application for providing one click printing according to the present invention. In FIG. 7, an analyzer 710 receives input 702 regarding a position of a cursor that is analyzed to obtain a document identifier associated with a document to be printed. An interpreter 720 also receives the input 702 that includes a user's action that is used to determine when the user has selected to print a document associated with the document identifier using a single user action. A pull print requester 730 sends the obtained document identifier 740 to a print job acceptor when the interpreter has determined that the user has selected to print a document associated with the document identifier using a single user action.

Figure 8:
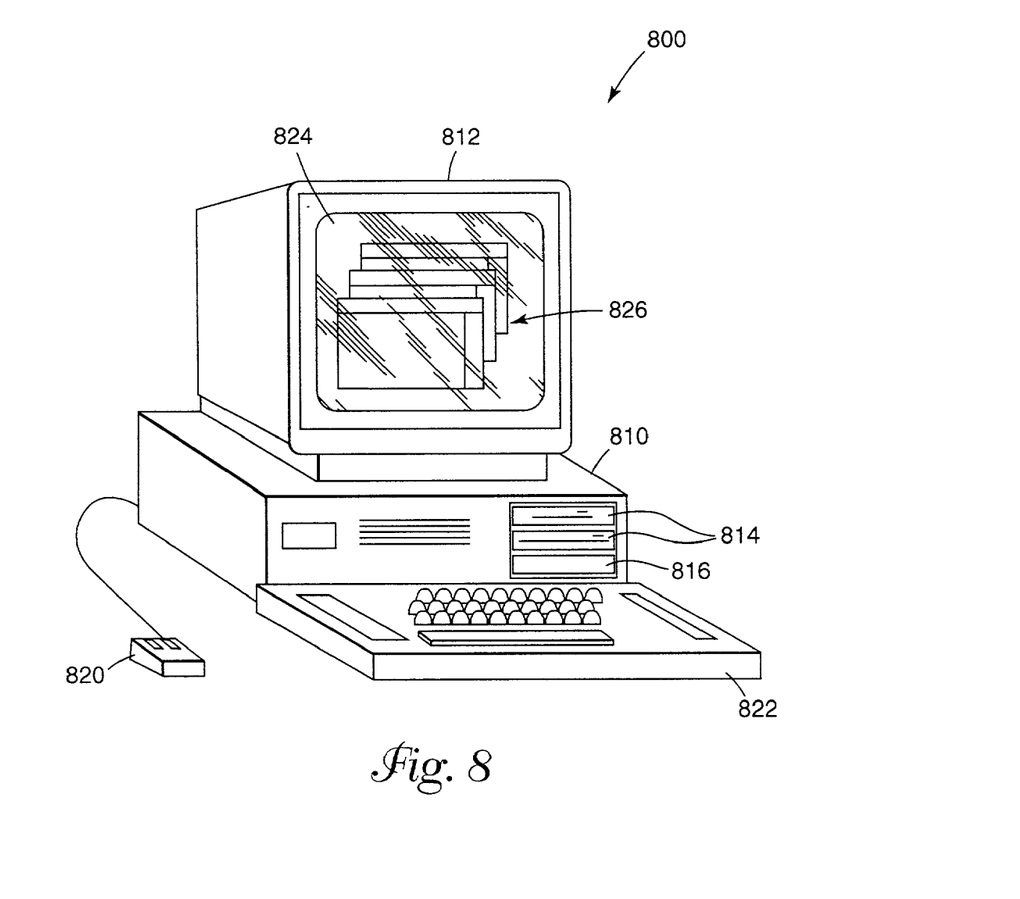
FIG. 8 is a block diagram that illustrates an exemplary hardware environment for providing one click printing according to the present invention.

FIG. 8 is a block diagram 800 that illustrates an exemplary hardware environment for providing one click printing according to the present invention. The present invention is typically implemented using a computer 810 comprised of a microprocessor, random access memory (RAM), read-only memory (ROM), and other components. It is envisioned that attached to the computer 810 may be a monitor 812, floppy disk drives 814, and CD-ROM drives 816. Also included in the preferred embodiment may be input devices, for example, a mouse pointing device 820 and a keyboard 822.

The computer 810 operates under the control of an operating system 824, such as the Windows, OS/2, Macintosh, or UNIX operating systems, which is represented in FIG. 8 by the screen display on the monitor 812. The computer 810 executes one or more computer programs 826, which are represented in FIG. 8 by the "windows" displayed on the monitor 812, under the control of the operating system 824.

Generally, the operating system 824 and the computer programs 826 may be tangibly embodied in a computer-readable medium or carrier, e.g. one or more of the fixed and/or removable data storage devices 814 and 816, or other data storage or data communications devices. Both the operating system 824 and the computer programs 826 may be loaded from the data storage devices 814 and 816 into the random access memory of the computer 810 for execution by the microprocessor as discussed above with reference to FIGS. 1–7. Both the operating system 824 and the computer programs 826 comprise instructions which, when read and executed by the microprocessor of the computer 810, causes the computer 810 to perform the steps necessary to execute the steps or elements of the present invention.

Although an exemplary computer system configuration is illustrated in FIG. 8, those skilled in the art will recognize that any number of different configurations performing similar functions may be used in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing one click printing, comprising:
providing a document identifier for a document to a print job acceptor using a single user action; and
acquiring and printing the document by the print job acceptor based upon the provided document identifier;
wherein the providing the document identifier further comprises selecting a document, determining whether the selected document can be handled by the print job acceptor and submitting the document identifier to the print job acceptor for acquiring and printing the document when the document can be handled by the print job acceptor and wherein the document identifier comprises a uniform resource locator.

2. The method of claim 1 wherein the single user action comprises clicking on the uniform resource locator.

3. The method of claim 2 wherein the providing comprises sending the uniform resource locator to the print job acceptor.

4. The method of claim 1 wherein the single user action comprises displaying a context menu associated with the uniform resource locator and selecting to direct print the document identified by the uniform resource locator using a single operation of a cursor control device.

5. The method of claim 4 wherein the providing comprises sending the uniform resource locator to the print job acceptor based upon the selection of the direct print of the document.

6. The method of claim 4 wherein cursor control device comprises a computer mouse and the single operation comprises depressing a mouse button to cause the context menu to be displayed and releasing the mouse button with the cursor positioned over a direct print menu selection to cause the direct print of the document identified by the uniform resource locator to be selected.

7. The method of claim 1 further comprising configuring an application for one click printing prior to providing a document identifier.

8. The method of claim 7 wherein the configuring an application for one click printing comprises installing an application plug-in for interpreting the user actions.

9. The method of claim 8 wherein the installing further comprises selecting a print job acceptor for providing one click printing.

10. The method of claim 8 wherein the installing further comprises displaying a menu for selecting a print job acceptor for providing one click printing.

11. The method of claim 8 wherein the installing further comprises sending a query to all print job acceptors to determine whether a print job acceptor supports direct printing.

12. The method of claim 1 further comprising determining whether a plug-in for handling the data is installed and submitting the document identifier to the print job acceptor for acquiring and printing the document when the plug-in for handling the document is installed.

13. The method of claim 12 further comprising displaying a menu for selecting viewing or printing the document when the plug-in for handling the document is installed.

14. An article of manufacture comprising a computer program storage medium readable by a computer, the medium tangibly embodying one or more computer program encoded with instructions executable by the computer to perform a method for providing one click printing, the method comprising:
providing a document identifier for a document to a print job acceptor using a single user action; and
acquiring and printing the document by the print job acceptor based upon the provided document identifier;
wherein the providing the document identifier further comprises selecting a document, determining whether the selected document can be handled by the print job acceptor; and submitting the document identifier to the print job acceptor for acquiring and printing the document when the document can be handled by the print job acceptor and wherein the document identifier comprises a uniform resource locator.

15. The article of manufacture of claim 14 wherein the single user action comprises clicking on the uniform resource locator.

16. The article of manufacture of claim 15 wherein the providing comprises sending the uniform resource locator to the print job acceptor.

17. The article of manufacture of claim 14 wherein the single user action comprises displaying a context menu associated with the uniform resource locator and selecting to direct print the document identified by the uniform resource locator using a single operation of a cursor control device.

18. The article of manufacture of claim 17 wherein the providing comprises sending the uniform resource locator to the print job acceptor based upon the selection of the direct print of the document.

19. The article of manufacture of claim 17 wherein cursor control device comprises a computer mouse and the single operation comprises depressing a mouse button to cause the context menu to be displayed and releasing the mouse button with the cursor positioned over a direct print menu selection to cause the direct print of the document identified by the uniform resource locator to be selected.

20. The article of manufacture of claim 14 further comprising configuring an application for one click printing prior to providing a document identifier.

21. The article of manufacture of claim 20 wherein the configuring an application for one click printing comprises installing an application plug-in for interpreting the user actions.

22. The article of manufacture of claim 21 wherein the installing further comprises selecting a print job acceptor for providing one click printing.

23. The article of manufacture of claim 21 wherein the installing further comprises displaying a menu for selecting a print job acceptor for providing one click printing.

24. The article of manufacture of claim 14 wherein the installing further comprises sending a query to all print job acceptors to determine whether a print job acceptor supports direct printing.

25. The article of manufacture of claim 14 further comprising determining whether a plug-in for handling the document is installed and submitting the document identifier to the print job acceptor for acquiring and printing the document when the plug-in for handling the document is installed.

26. The article of manufacture of claim 25 further comprising displaying a menu for selecting viewing or printing the document when the plug-in for handling the document is installed.

* * * * *